(12) United States Patent
Huang (10) Patent No.: US 6,581,655 B2
(45) Date of Patent: Jun. 24, 2003

(54) WORK BENCH OF PROCESS MACHINERY

(75) Inventor: Peter Huang, Taichung (TW)

(73) Assignee: Duro Machinery Corp., Taichung (TW)

( * ) Notice: Subject to any disclaimer, the term of this patent is extended or adjusted under 35 U.S.C. 154(b) by 17 days.

(21) Appl. No.: 09/887,177

(22) Filed: Jun. 25, 2001

(65) Prior Publication Data

US 2002/0195168 A1 Dec. 26, 2002

(51) Int. Cl.$^7$ ................................................. B25H 1/14
(52) U.S. Cl. ........................ 144/287; 83/438; 83/468.7; 83/477.2; 269/298 R
(58) Field of Search ............................. 144/287, 286.1, 144/286.5; 269/289 R, 304; 108/69; 83/468.6, 468.7, 477.2, 468.5, 438

(56) References Cited

U.S. PATENT DOCUMENTS

| 718,026 A | * | 1/1903 | Robinson ..................... 108/69 |
| 2,852,049 A | * | 9/1958 | Peterson ........................ 83/438 |
| 4,133,360 A | * | 1/1979 | Sanfilippo et al. ........ 144/286.1 |
| 4,964,450 A | * | 10/1990 | Hughes et al. ............ 144/286.5 |
| 5,363,893 A | * | 11/1994 | Grochowicz .................. 108/69 |
| 6,062,121 A | * | 5/2000 | Ceroll et al. ................. 144/287 |

* cited by examiner

Primary Examiner—Allen Ostrager
Assistant Examiner—Shelley Self
(74) Attorney, Agent, or Firm—Browdy and Neimark, P.L.L.C.

(57) ABSTRACT

A work bench of a process machine has a first work table and a second work table which is joined with the first work table such that the second work table is capable of moving toward or away from the first work table; a material stopping member of a material stopping device capable of moving between the first and the second work tables, an indicating devise comprising a ruler and an indicating portion. The ruler is fixed on the first work table. The indicating portion changes its position along with the position of the material stopping member to point at the scale value of the ruler.

5 Claims, 13 Drawing Sheets

WORK BENCH OF PROCESS MACHINERY

FIELD OF THE INVENTION

The present invention relates generally to a process machinery, and more particularly to a work bench of the process machinery.

BACKGROUND OF THE INVENTION

The process machine, such as a circular saw or wood working tool, is generally provided with a work bench to facilitate the placing of a workpiece. The size of the work bench is generally dependent on the size of the workpiece as well as the process pattern. In other words, the process machine is provided with a relatively large work bench to facilitate the processing of a correspondingly large workpiece. However, it is conceivable that an excessively large work bench takes up an additional floor space and is often charged an extra transportation fees. On the contrary, a small-sized work bench is incapable of providing a workpiece with a stable load effect, even though the small-sized work bench is cheaper to ship and does not take up a large floor space. For the reasons stated above, the size of the work bench is often taken into consideration by a purchaser of a process machine.

SUMMARY OF THE INVENTION

It is the primary objective of the present invention to provide a process machine with a work bench which can be changed in size of the area for loading a workpiece in accordance with the size of the workpiece.

It is another objective of the present invention to provide a process machine with a work bench which is provided with a size indicating device for examining the size of a workpiece to be processed by the process machine.

It is still another objective of the present invention to provide a process machine with a work bench which is user-friendly.

It is still another objective of the present invention to provide a process machine with a portable work bench which does not take up a large floor space and can be easily packaged and shipped economically.

The process machine work bench of the present invention comprises a first work table which is provided with a first reference, at least one joining portion, and at least one guide portion; a second work table which is provided with at least one connection portion and at least one second guide portion. The connection portion is joined with the joining portion such that the connection portion slide back and forth along a predetermined direction provided by the joining portion, so as to enable the second work table to move toward or away from the first work table. The second guide portion and the first guide portion are coaxially disposed. A material stopping device comprises a material stopping member and a locating member. The material stopping member has a second reference portion and at least one slide portion capable of sliding along the first guide portion or the second guide portion, thereby enabling the material stopping member to move between the first work table and the second work table. The locating member is intended to enable the material stopping member to be fixed at any position of the work tables. An indicating device comprises a ruler and an indicating portion. The ruler is fixed on the first work table and is provided with a first direction extension scale. The indicating portion is changed in its position along with the change in position of the material stopping member in relation to the first direction extension scale.

DETAILED DESCRIPTION OF THE INVENTION

Figure 1:
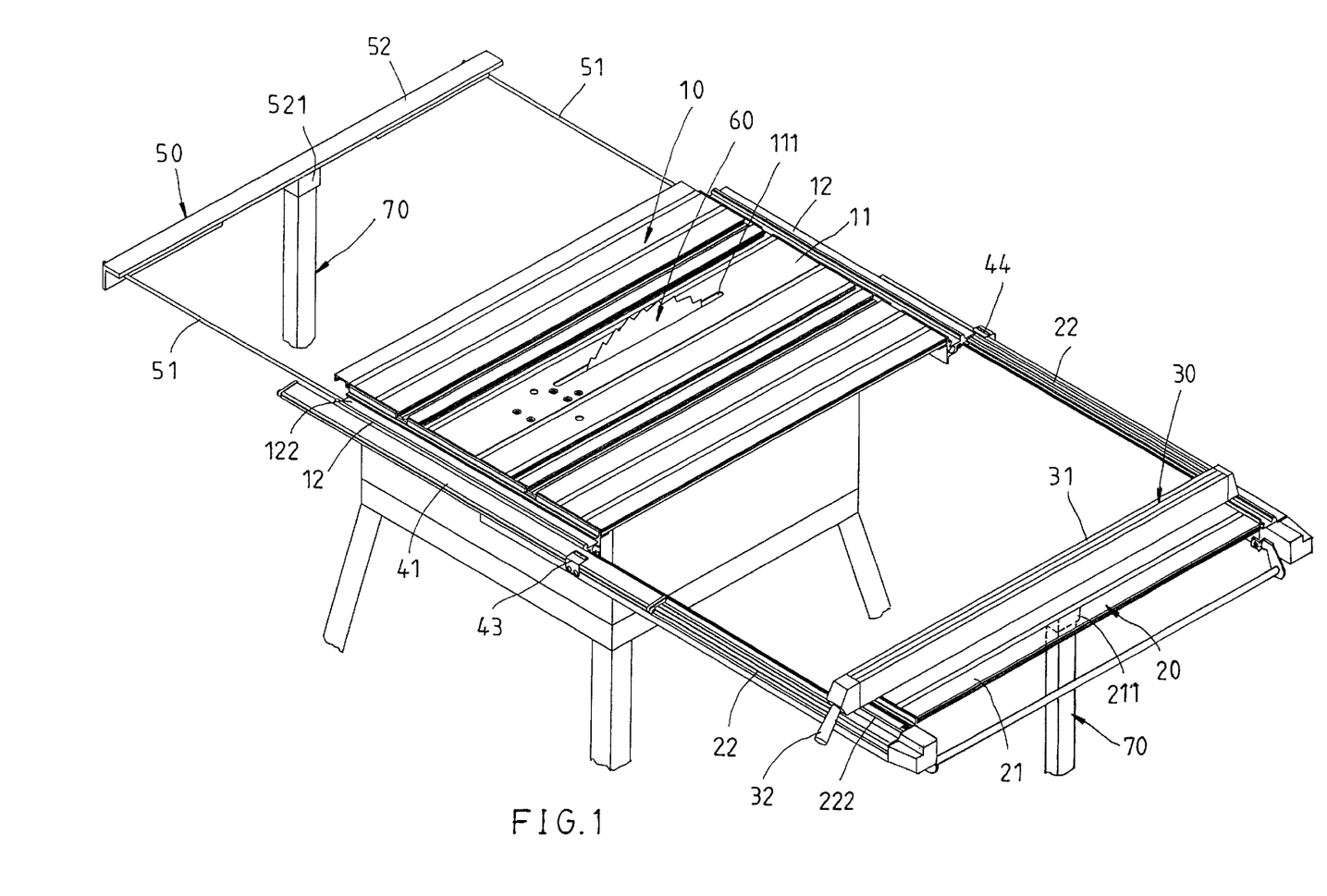
FIG. 1 shows a perspective view of a preferred embodiment of the present invention.
Figure 2:
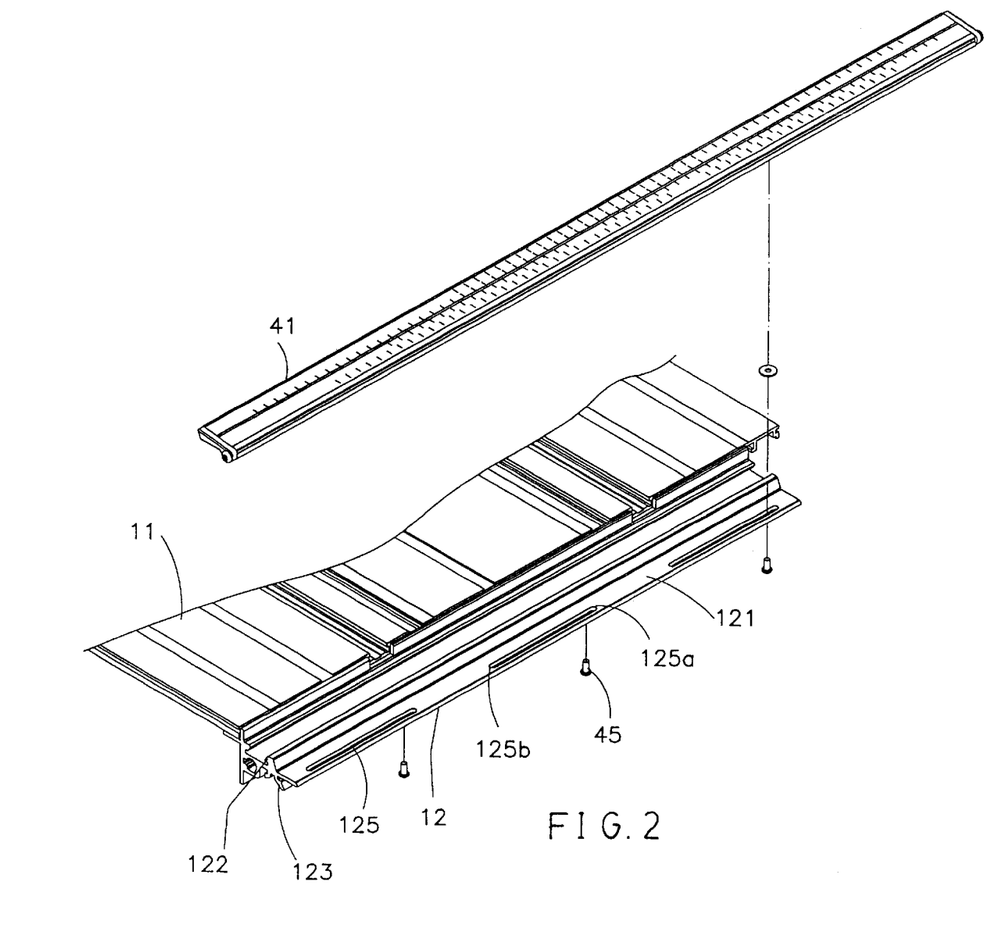
FIG. 2 shows a schematic view of the ruler of the indicating device joining the first work table of the present invention.
Figure 6:
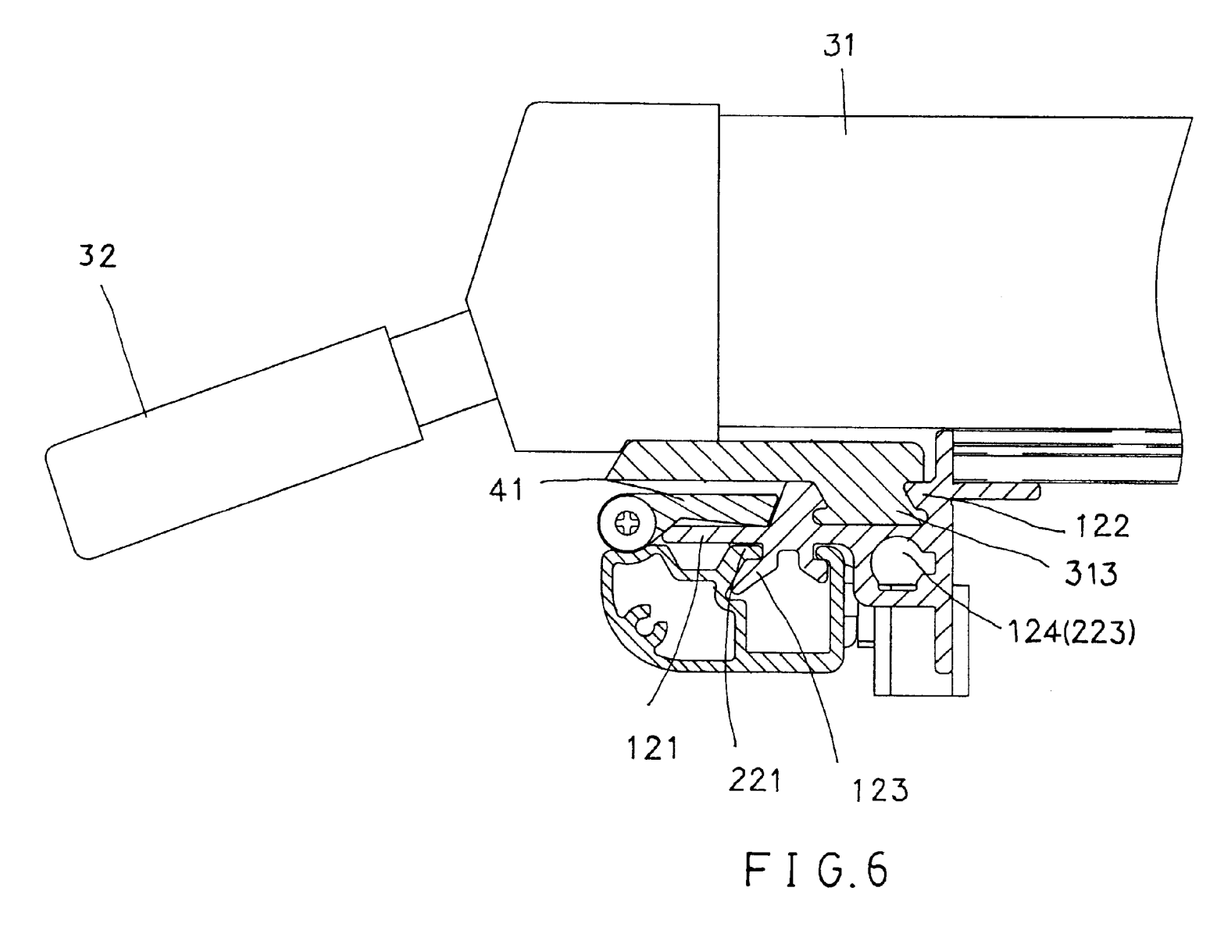
FIG. 6 shows a sectional view taken along a line 6—6 as shown in FIG. 4.

As shown in FIGS. 1, 2, and 6, a process machine work bench of the present invention comprises a first work table 10, a second work table 20, a material stopping device 30, an indicating device 40, and an extension frame 50.

The first work table 10 is formed of a first plate 11 and two long side frames 12, which are all made of aluminium by extrusion. The first plate 11 is provided with a long slot 111 for mounting a saw blade 60. The long slot 111 has a center position forming the first reference portion (saw blade 60 position) of the first work table 10.

The two side frames 12 are similar in construction to each other and are fastened with two sides of the first plate 11 by a plurality of bolts and nuts (not shown in the drawings). Each side frame 12 has a horizontal extension plate 121 which is provided in the top and in the underside with a guide slot 122 and a guide rail 123, which extend along the long side thereof. The guide slot 122 forms a first guide portion. The guide rail 123 forms a joining portion of the first work table 10. The extension plate 121 is provided in the underside with a first through hole 124. The extension plate 121 of one side frame 12 is provided with three long sectional slots 125, with each having a first end 125a and a second end 125b.

The second work table 20 is made of aluminum by extrusion and is formed of a second plate 21 and two joining members 22. The joining members 22 are of a long rail-like construction and are fastened with two sides of the second plate 21, thereby enabling the second work table 20 to be of an inverted U-shaped frame. Each joining member 22 has a slide slot 221 forming a connection portion to join with the joining portion of the first work table 10. The slide slot 221 is fitted with the guide rail 123. By making use of a predetermined direction provided by the guide rail 123, the second work table 20 is enabled to slide back and forth in the direction toward or away from the first work table 10. The connection place of the joining member 22 and the first plate 21 is provided with a guide slot 222 which forms a second guide portion which is similar in construction to the first guide portion and is coaxially disposed along with the first guide portion. Each joining portion 22 is provided under the guide slot 222 thereof with a second through hole 223 which is coaxial with the first through hole 124.

The material stopping device 30 has a material stopping member 31 and a locating member (not shown in the drawing). The material stopping member 31 is a long bar body with an inverted U-shaped cross section and is provided in the vertical sides of two sides thereof with a second reference portion 311 and a third reference portion 312, and in the underside of two side ends thereof with a slide rail 313 which is inserted into the guide slot of the work tables referred to above. The material stopping member 31 slides along the first guide portion (guide slot 122) or the second guide portion (guide slot 222) and between the first work table 10 and the second work table 20.

The locating member has a pull rod 32 which is joined with one end of the material stopping member 31. By wrenching the pull rod 32, the connection member (not shown in the drawing) of the interior of the material stopping member 31 is actuated such that the material stopping member 31 is fixed at any position of each work table. The material stopping member 31 may be movably adjusted by wrenching the pull rod 32. The locating member is a prior art structure.

The indicating device 40 comprises a ruler 41, an indicating portion 42, a first pointer 43, and a second pointer 44. The ruler 41 is fastened with the first work table 10 by a plurality of bolts 45, which are engaged with the threaded holes of the underside of the ruler 41 via the sectional slots 125 of the side frame 12. The bolts 45 of the preferred embodiment are located at the first end 125a of the sectional slot 125.

Figure 3:
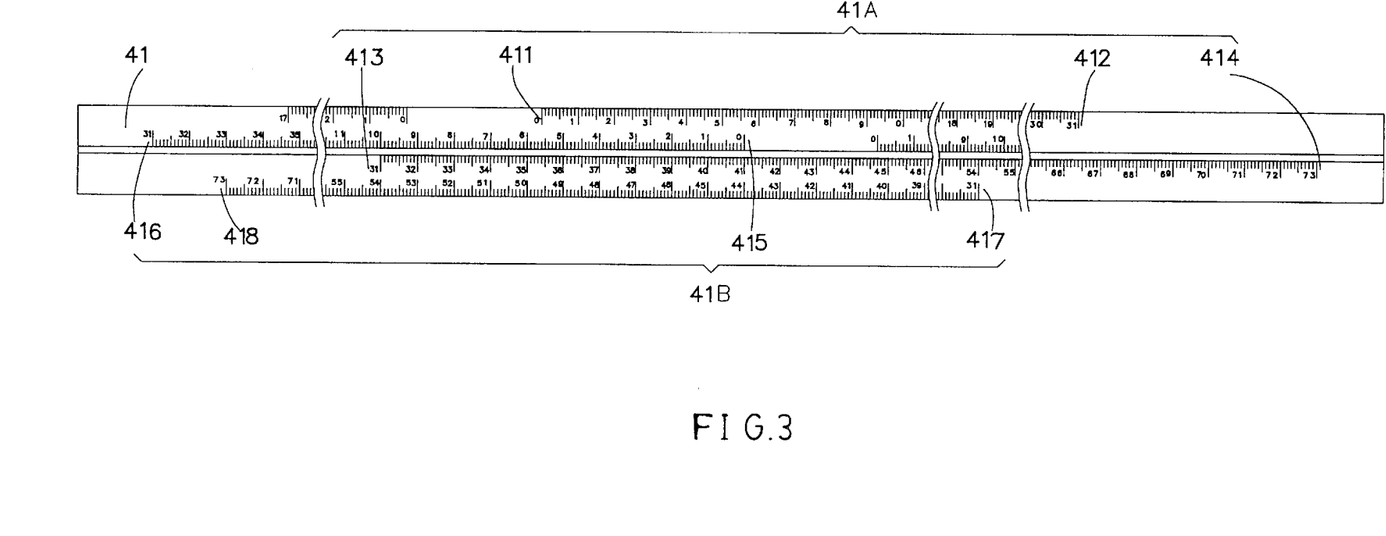
FIG. 3 shows a schematic view of the ruler markings of the indicating device of the present invention.

The ruler 41, as shown in FIG. 3, has various colors to represent the graduated markings, which have a first direction (right direction) extension scale 41A and a second direction (left direction) extension scale 41B. The first direction extension scale 41A comprises a first initial point 411, a first terminal point 412, a second initial point 413, and a second terminal point 414. The second direction extension scale 41B comprises a third initial point 415, a third terminal point, a fourth initial point 417, and a fourth terminal point 418. In this preferred embodiment, the scale values of the first and the third initial points 411, 415 of the ruler 41 are "o". The scale values of the first and the third terminal points 412, 416 are same as the scale values of "31" of the second and the fourth initial points 413, 417. The scale values of the second and the fourth terminal points 414, 418 are "73". The unit of the scale values referred to above is cm.

Figure 5:
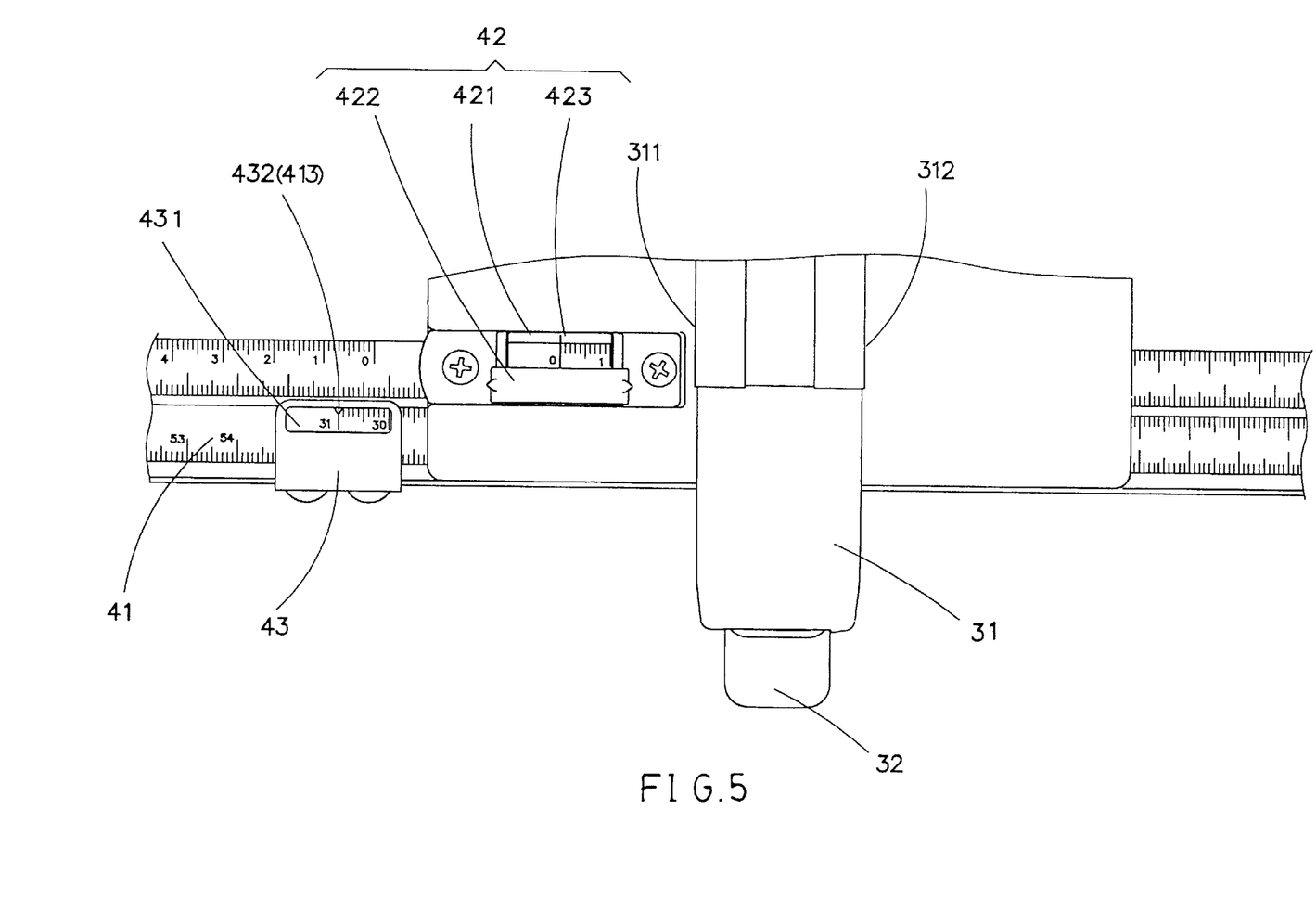
FIG. 5 is a partial enlarged view of FIG. 4 to describe the distance "o" between the first reference portion and the second reference portion.

The indicating portion 42 is a window, as shown in FIG. 5. The window moves along with the material stopping member 31 and comprises a transparent plate 421 and an opaque shield plate 422. The transparent plate 421 has a base line 423 for pointing correspondingly each scale grade. The area of the shield plate 422 is half of the area of the transparent plate 421. The shield plate 422 shields the transparent plate 421 such that the shield plate 422 can be displaced to mask the half area of the transparent plate 421. The indicating portion 42 is intended to indicate the grades between the first initial point 411 and the first terminal point 412, or between the third initial point 415 and the third terminal point 416.

The first pointer 43 and the second pointer 44 are of an inverted L-shaped plate and are respectively fixed on a joining member 22. The side plate of each pointer has an open hole 431, 441, and a point 432, 442. The pointers move along with the second work table 20. The point 432 of the first pointer 43 is used to indicate the grades in use between the second initial point 413 and the second terminal point 414. The point 442 of the second pointer 44 is used to indicate the grades in use between the fourth initial point 417 and the fourth terminal point 418.

The extension frame 50 comprises two guide rods 51 and a placing plate 52. The two guide rods 51 are inserted into the first through holes 124 of the two side frames 12 and the second through holes 223 of the joining member 22. The placing plate 52 connects the two guide rods 51 and is located at the opposite side of the second plate 20. The second plate 21 and the placing plate 52 are provided in the underside with an insertion portion 211, 521 for receiving one end of a support rod 70. The other end of the support rod 70 is rested on the ground surface.

Figure 4:
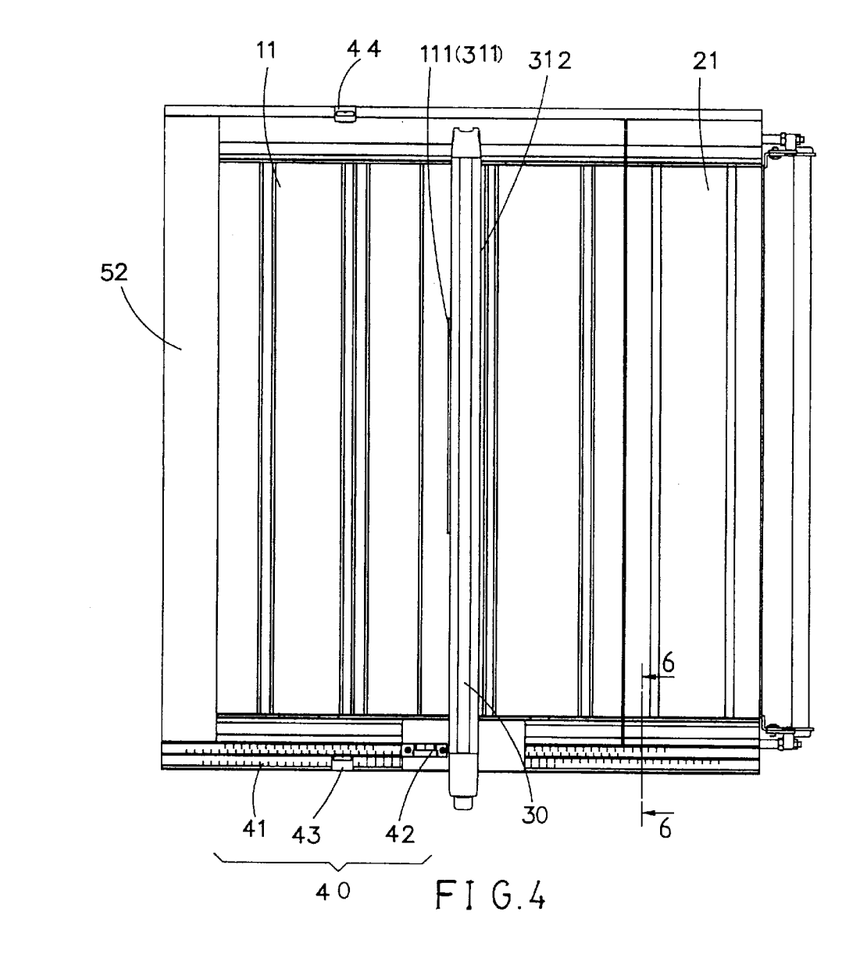
FIG. 4 shows a schematic view of the work bench of the present invention not in use.

As shown in FIG. 4, the second plate 21 of the second work table 20 and the placing plate 52 of the extension frame 50 are joined together with the first plate 11 of the first work table 10 to form a rectangular work bench. The material stopping member 31 is near the saw blade 60. The long slot hole 111 is used as a first reference portion which is separated from the second reference portion 311 of the material stopping portion 31 by a distance which is zero. As shown in FIG. 5, the base line 423 of the indicating portion 42 is corresponding to the first initial point 411 (the grade being zero) of the first direction extension scale 41A. The point 432 of the first pointer 43 points at the second initial point 413 (the grade being 31).

Figure 7:
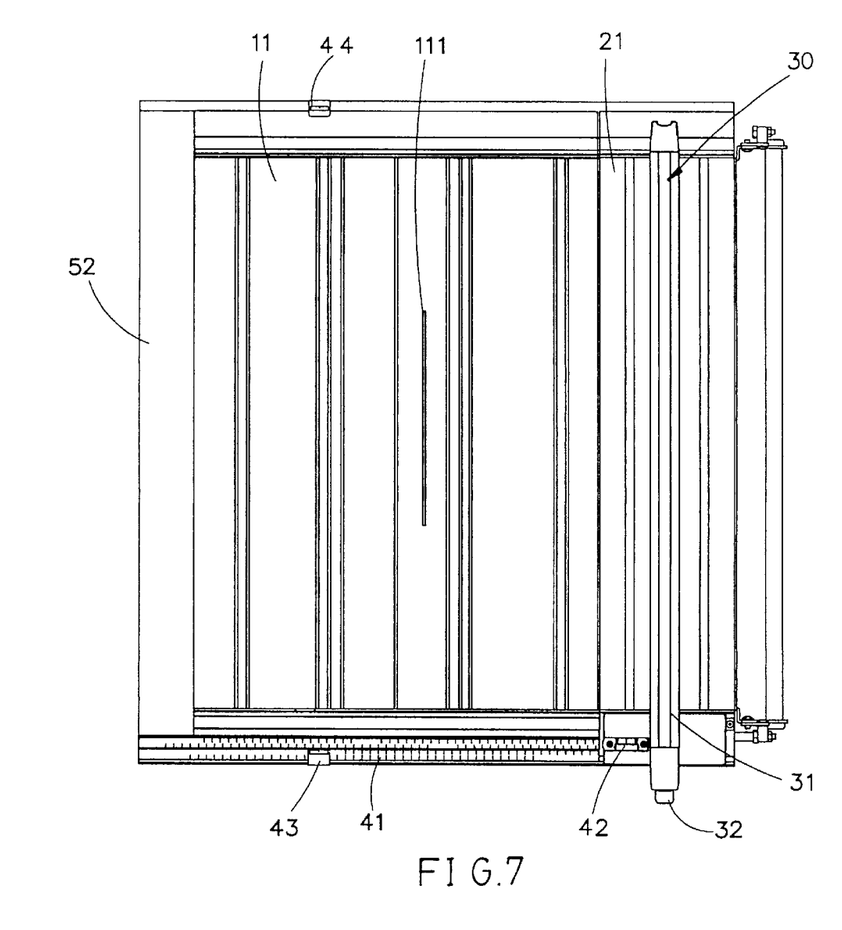
FIG. 7 shows a schematic view of the present invention in use along with a relatively short workpiece.
Figure 8:
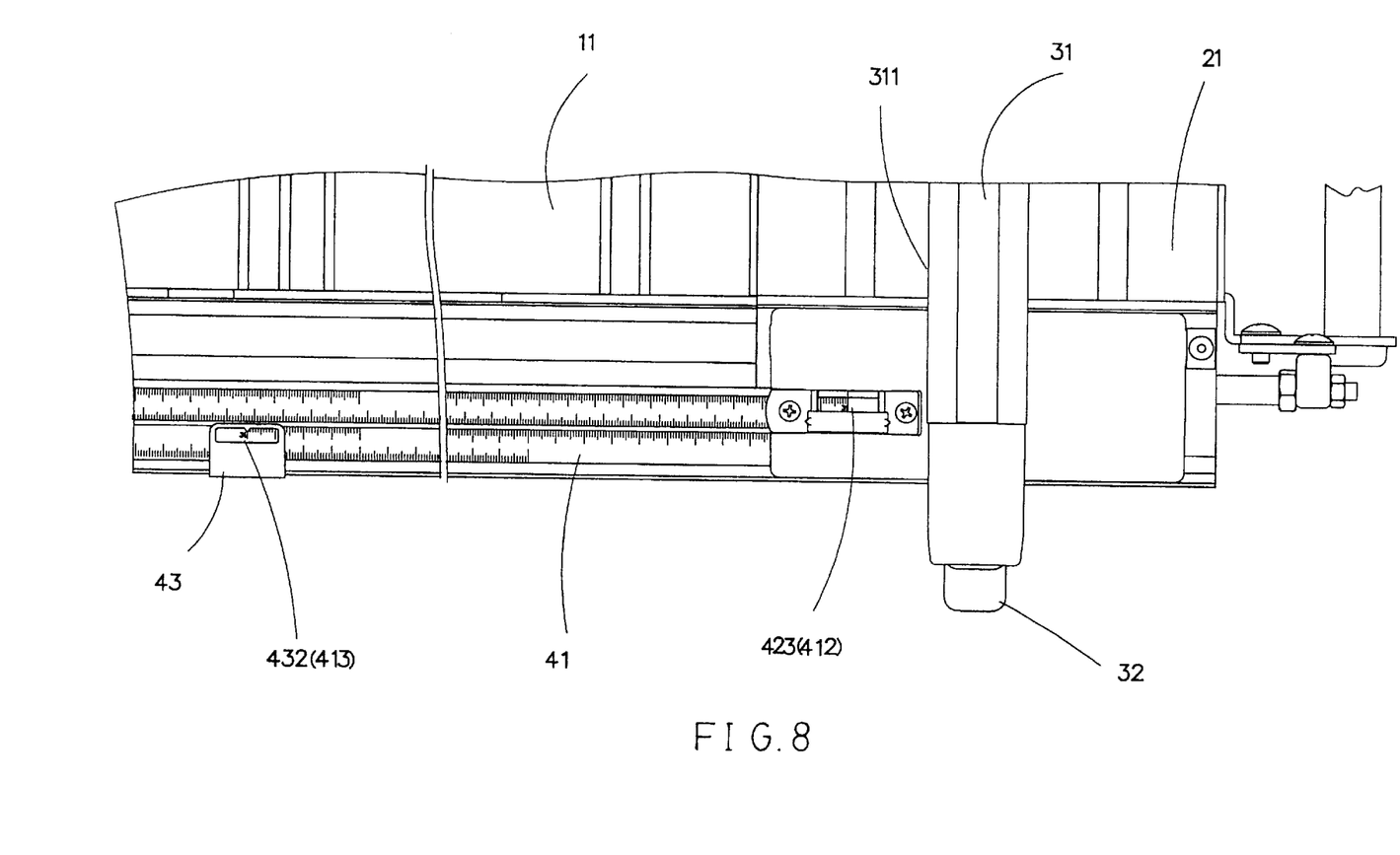
FIG. 8 shows an enlarged view of the graduated markings of FIG. 7.

When a workpiece is to be processed, the pull rod 32 is wrenched to enable the material stopping member 31 to be displaced and adjusted on the first plate 11 and the second plate 21. In the meantime, the operator observes the distance between the first reference portion and the second reference portion 311 by means of the base line 423 of the window, which is corresponding to the scale value of the first direction extension scale 41A. Thereafter, the pull rod 32 is wrenched to fix the material stopping member 31. The distance referred to above is equal to the length of the post-process workpiece, as shown in FIGS. 7 and 8. The material stopping member 31 is displaced and located on the second plate 21. The base line 423 is corresponding to the first terminal point 412 (the grade being 31), indicating the post-process length of the workpiece being 31 cm.

Figure 9:
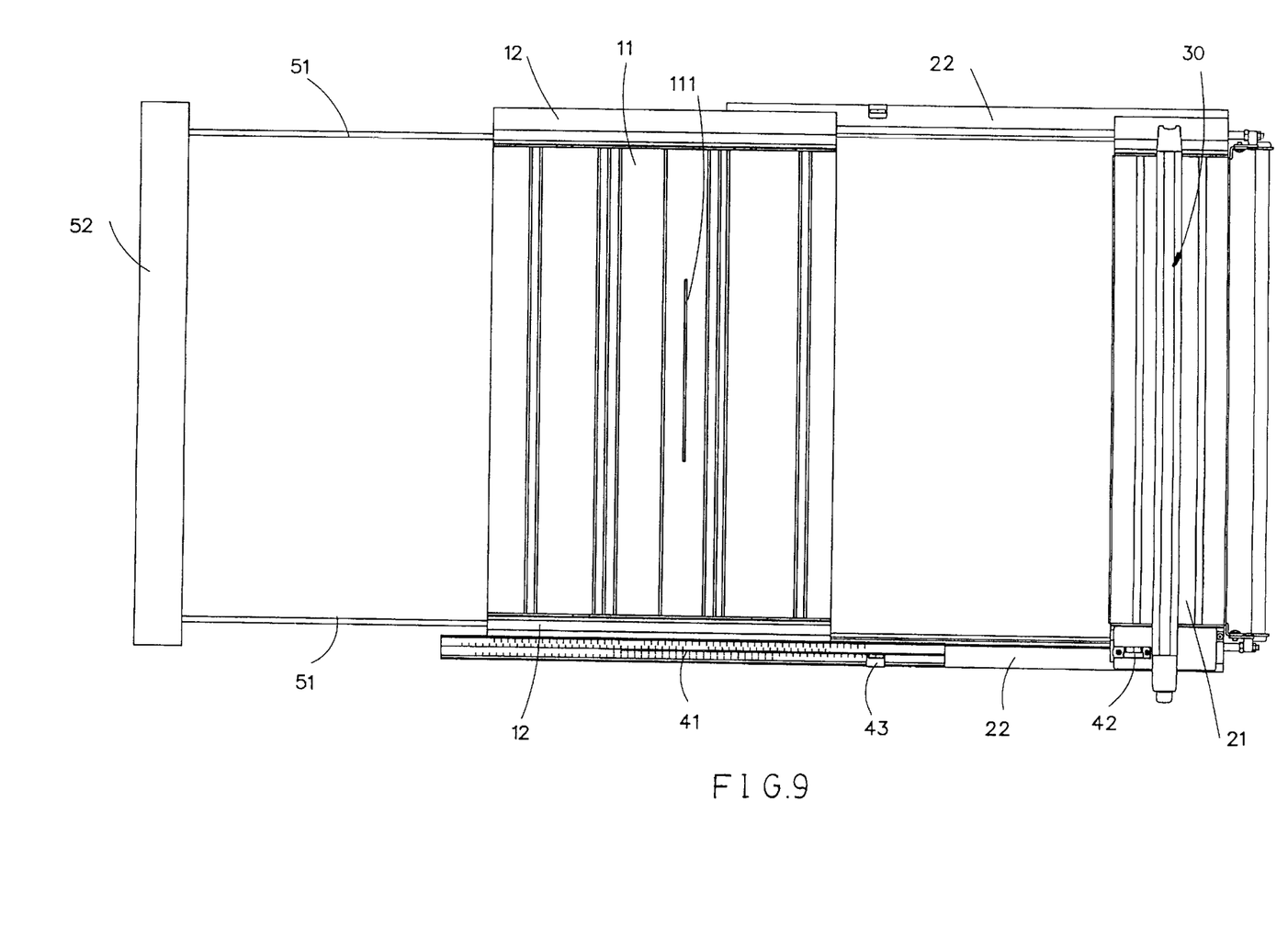
FIG. 9 shows a schematic view of the present invention in use along with a relatively long workpiece.
Figure 10:
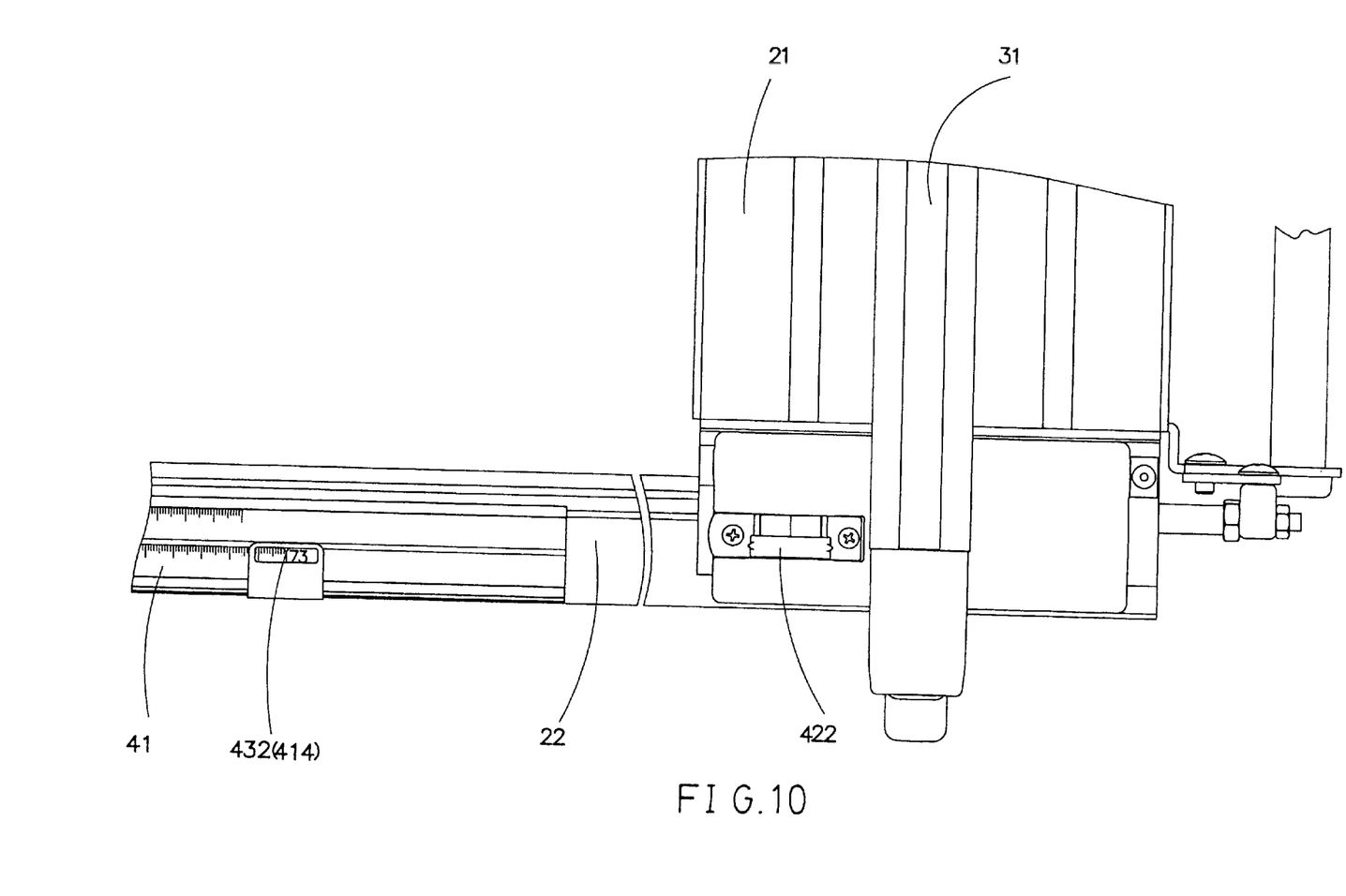
FIG. 10 shows an enlarged view of the graduated markings of FIG. 9.

As shown in FIGS. 1 and 9, the present invention is applied to the process of a longer workpiece. The material on the second plate 21 such that the base line 423 is corresponding to the scale value of 31. The second work table 20 is pulled out in the first direction (right direction) such that the point 432 of the first pointer 43 begins to move from the second initial point 413 (the grade of 31) to the second terminal point 414 (the grade of 73). The increase in grade corresponding to the point 432 represent the increase in distance between the first reference portion and the second reference portion 311, as shown in FIG. 10 in which the base line 423 is corresponding to the second terminal point 414, indicating the post-process length of the workpiece being 73 cm.

This longer workpiece can be stably loaded. The second plate 21 is provided thereunder with the support rod 70. In the meantime, the extension frame 50 is pulled out in the second direction (left direction) such that other end of the workpiece is placed on the placing plate 52. The placing plate 52 is provided thereunder with a support rod 70, thereby attaining the stabilizing effect.

The second worktable 20 can be pulled out in relation to the first worktable 10, so as to adjust the size of the workpiece loading area in accordance with the size of the workpiece. As shown in FIG. 9, the first direction extension scale 41A is applied to the process of a longer workpiece. As shown in FIG. 7, the present invention is applied to the process of a shorter workpiece or is kept in small volume to facilitate the packaging and the shipping of the present invention.

Figure 11:
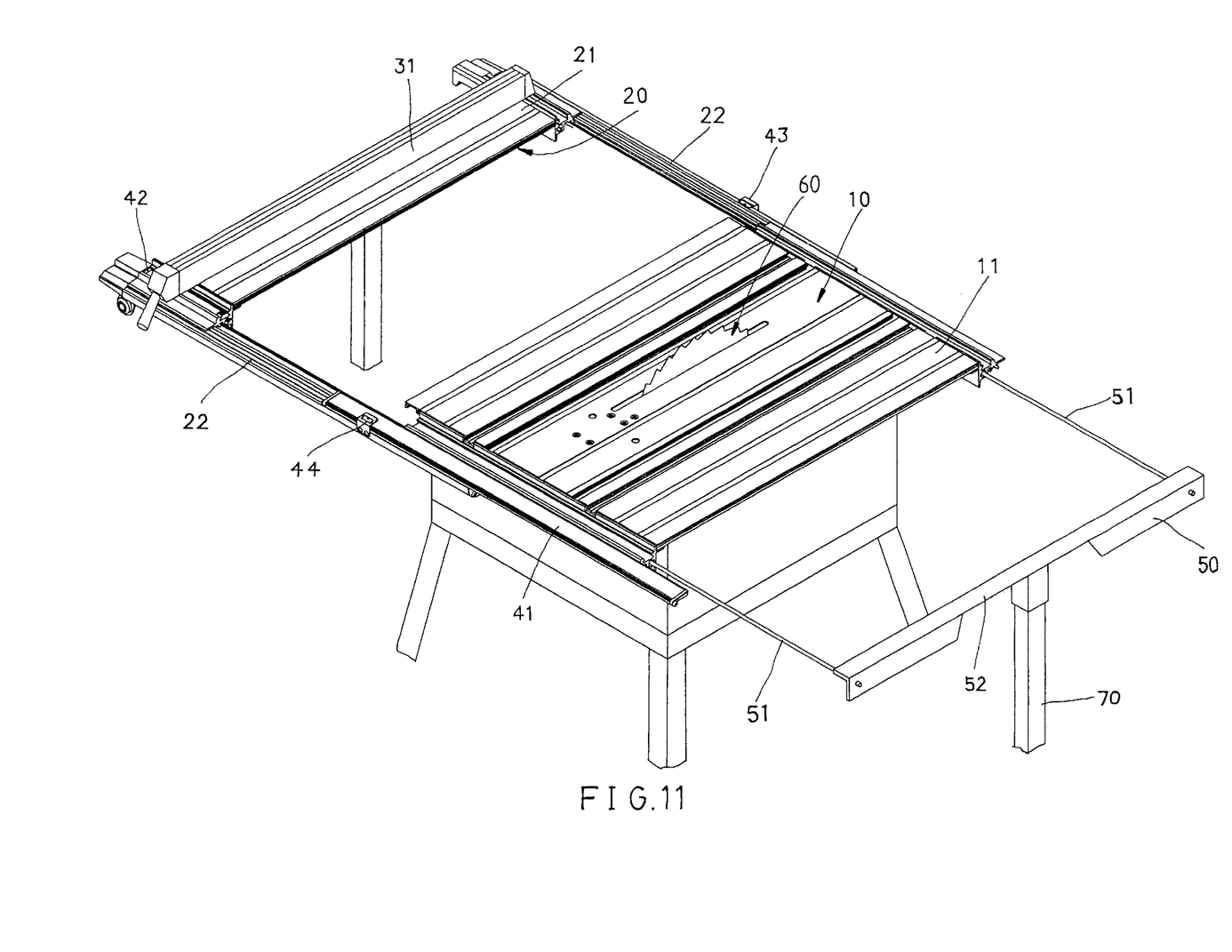
FIG. 11 shows another schematic view of the work bench of the present invention in use in another form.

The second work table 20 of the present invention can be changed in the direction in which it is pulled out, so as to suit the operator's work habit. As shown in FIG. 11, the second work table 20 and the extension frame 50 are drawn out and separated from the first work table 10 such that they are switched in position before they are once again joined with the first work table 10. When the material stopping member 31 is horizontally displaced to join with the work bench, the indicating portion 42 which is disposed on the material stopping member 31 is still located on the same side as the ruler 41. The cutting length reference is changed to begin with the first reference portion to the third reference portion 312.

Figure 12:
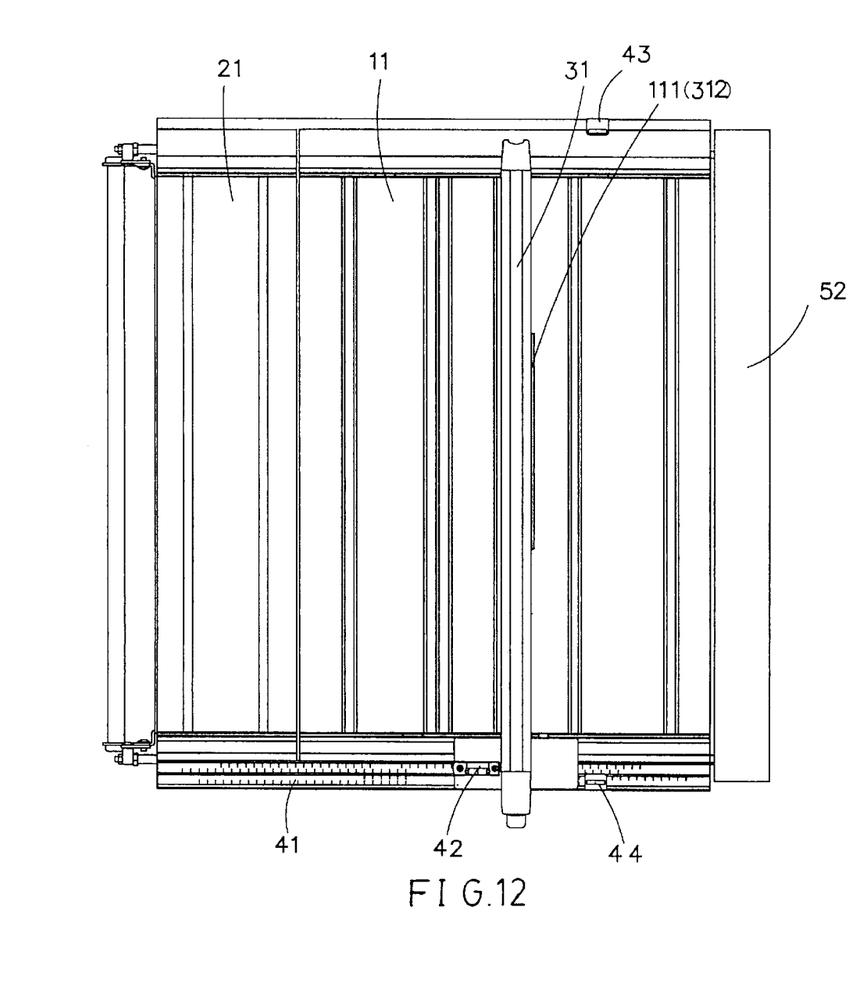
FIG. 12 is a schematic plan view to describe the distance "o" between the first reference portion and the third reference portion of the present invention.
Figure 13:
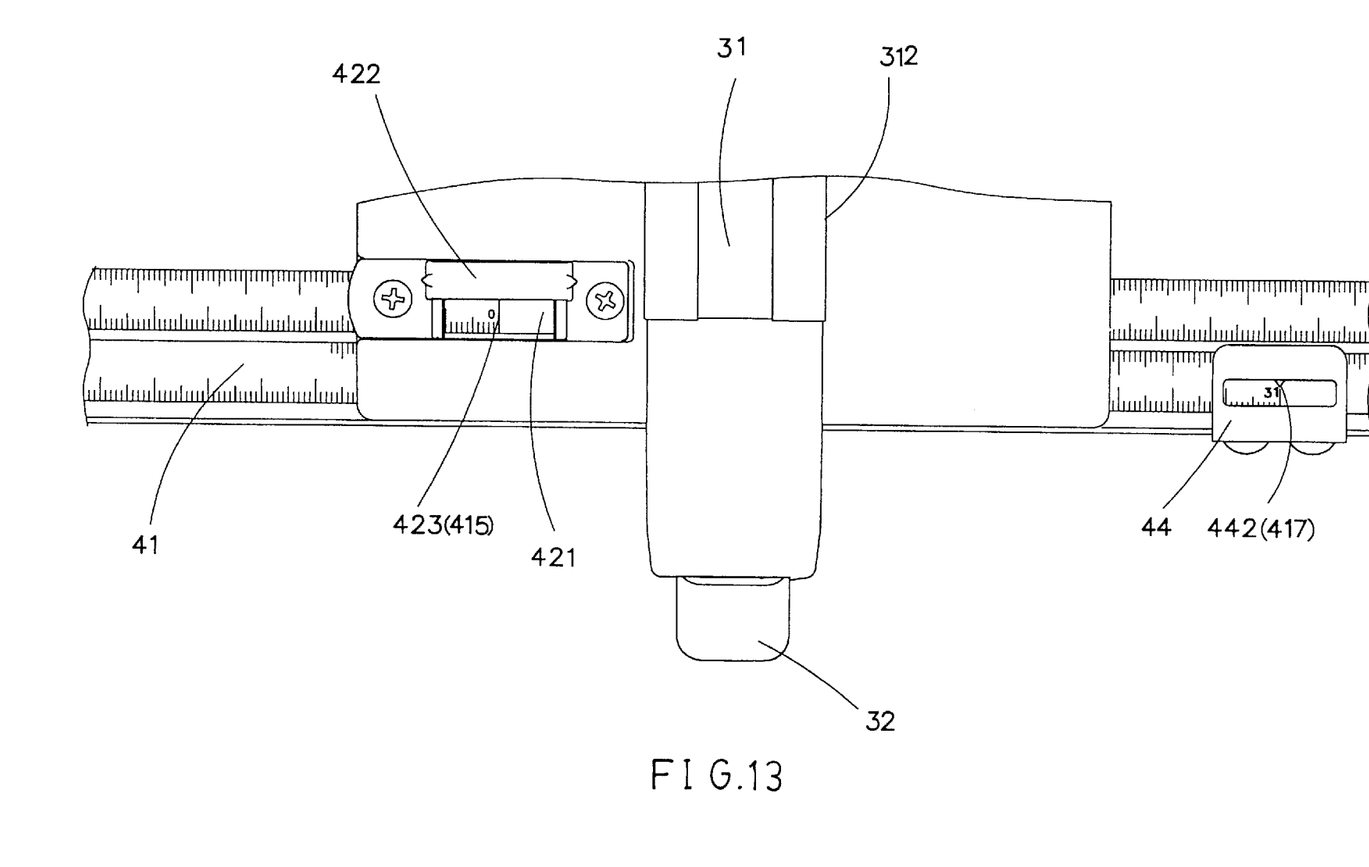
FIG. 13 shows an enlarged view of the graduated markings of FIG. 12.

When the above-mentioned members are switched, the ruler 41 is moved toward the second direction (left direction). As a result, the bolt 45 of the bottom of the ruler 41 is moved and fastened at the second end 125b of the sectional slot 125. The shield plate 422 of the indicating portion 42 is switched upwards along the transparent plate 421 to mask other half area of the transparent plate 421. When the material stopping member 31 is near the saw blade 60, as shown in FIGS. 12 and 13, the exposed base line 423 is aligned with the third initial point 415 (scale grade of o) of the second direction extension scale 41B. The point 442 of the second pointer 44 points at the fourth initial point 417 (scale grade of 31). These are done to facilitate the length adjustment in the future.

What is claimed is:

1. A process machine work bench comprising:

a first work table provided with a first reference portion, at least one joining portion, and at least one first guide portion;

a second work table provided with at least one connection portion and at least one second guide portion, said connection portion being joined with said joining portion of said first work table and capable of sliding back and forth along a predetermined direction provided by said joining portion of said first work table, thereby enabling said second work table to move toward or away from said first work table, said second guide portion being coaxial with said first guide portion;

a material stopping device having a material stopping member, said material stopping member having a second reference portion and at least one slide portion capable of sliding along said first guide portion or said second guide portion, thereby enabling said material stopping member and the second reference portion to move relative to the first reference portion between said fist work table and said second work table;

an indicating device comprising a ruler and an indicating portion, said ruler being disposed on said first work table and having a first direction extension scale, said indicating portion capable of changing position thereof along with said material stopping member on said first direction extension scale to indicate a distance between the first reference portion and the second reference portion;

wherein said first work table has two joining portions and two first guide portions; wherein said second work table has two connection portions and two second guide portions; wherein said material stopping member of said material stopping device has two slide portions;

wherein said first work table is formed of a first plate and two long side frames connected with two sides of said first plate, with each of said side frames having a horizontal extension plate which is provided in the top and the underside with a guide slot and a guide rail for forming said first guide portion and said joining portion; said second work table being of an inverted U-shaped construction and having a second plate and two joining members connected with two sides of said second plate, with each of said joining members having a slide slot and a guide slot for forming said connection portion and said second guide portion, said slot being fitted with said guide rail of said first work table; said material stopping member being a long bar body having an inverted U-shaped cross section and a vertical side which forms said second reference portion, said material stopping member provided at two ends of the underside with a slide rail capable of joining with said guide slot of said first work table or said second work table, said slide rail forming said slide portion of said material stopping member;

wherein said frames of said first work table are provided with a first through hole; wherein said joining members of said second work table are provided with a second through hole coaxial with said first through hole; an extension frame having two guide rods received in through holes, said extension frame having a placing plate connecting said two guide rods, said placing plate being located at the opposite side of said second plate.

2. The work bench as defined in claim 1, wherein said ruler is fixed on top of extension plate of one of said frames of said first work table, said first direction extension scale of said ruler comprising a first initial point, a first terminal point, a second initial point and a second terminal point, said first terminal point and said second initial point being equal in scale value to each other, said indicating portion being a window having a base line capable of pointing correspondingly any scale grade between said first initial point and said first terminal point; wherein said indicating device further comprises a first pointer fixed on one of the joining members to move along with second work table between said second initial point and said second terminal point.

3. The work bench as defined in claim 1, wherein said second plate and said placing plate are provided in the underside with an insertion portion for receiving one end of a support rod which has other end resting on the ground surface.

4. The work bench as defined in claim 1, wherein said second work table is capable of joining with other side of said first work table and said extension frame changing the joining position thereof oppositely.

5. The work bench as defined in claim 4, wherein said ruler is further provided with a second direction extension scale comprising a third initial point, a third terminal point, a fourth initial point, and a fourth terminal point, said third terminal point and said fourth initial point being equal in scale value to each other, said material stopping member having another vertical side forming a third reference portion movable with said material stopping member relative to said first reference portion, said base line of said indicating portion capable of pointing correspondingly any scale grade between said third initial point and said third terminal point, said indicating device further provided on other joining member with a second pointer capable of moving along with said second work table between said fourth initial point and said fourth terminal point.

\* \* \* \* \*